UNITED STATES PATENT OFFICE.

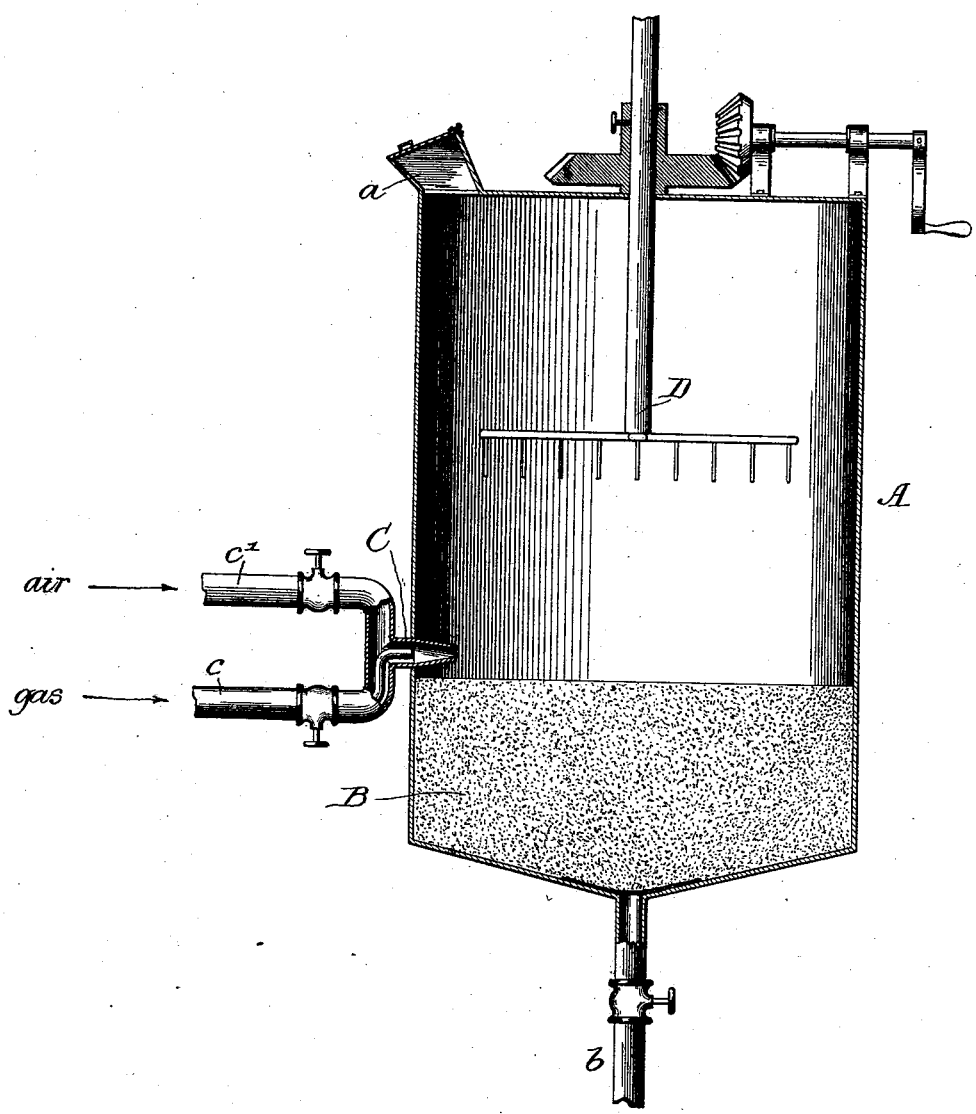

IRA H. JEWELL, OF CHICAGO, ILLINOIS.

METHOD OF SEWAGE DISPOSAL.

SPECIFICATION forming part of Letters Patent No. 506,880, dated October 17, 1893.

Original application filed December 22, 1891, Serial No. 415,845. Divided and this application filed August 8, 1892. Serial No. 442,437. (No specimens.)

*To all whom it may concern:*

Be it known that I, IRA H. JEWELL, of Chicago, in the county of Cook and State of Illinois, have invented certain new and useful Improvements in Methods of Sewage Disposal; and I do hereby declare that the following is a full, clear, and exact description thereof, reference being had to the accompanying drawing, and to the letters of reference marked thereon, which forms a part of this specification.

This invention relates to the art of treating and purifying sewage and other impure liquids.

Heretofore impure liquids and sewage have been treated by separating the impurities and the solid matter thereof from the liquid portion by various methods of filtration, and conveying the filtered liquid portion away to be used again.

Various means have heretofore been employed for disposing of the impurities and solid matters recovered from the liquids, by removing them simply to some other location. The filter was drained of its water, while the solid portion, either in a dry state or in a partially dry state, was removed from the filter and either deposited in some body of water or, after being treated and compressed for use as a fertilizer, was deposited on some piece of land for such use. In either of these cases the microbes, bacteria and disease germs recovered from the liquid by filtration remained in said solid portions of the sewage or impure liquid, and, not being killed or destroyed, they polluted the surrounding water into which said portions were deposited, thus producing disease and epidemics in localities where said water thus polluted was used. Moreover, said bacteria and germs not being dead or destroyed were thus in such condition as to propagate their kind and thus materially increase the probabilities of epidemics and disease.

Where the recovered solid portion of the sewage or other impure liquid has been used as a fertilizer of land, it has generally been treated by one of several common methods whereby the injurious effects of the bacteria therein contained are partially counteracted and until, at least, the said solids have been spread over and become incorporated with the soil, the action of the air and the heat of the sun thus tending to neutralize the injurious effects of the bacteria and disease germs. Each of these methods of disposing of the recovered solids from the liquid sewage, however, requires various devices and appliances for transporting said solids away from the filtering medium, and one of the objects of my invention is to employ a method of treating sewage that will obviate the necessity of using such transfer appliances by disposing of the solids without removal from the filtering medium.

The impurities recovered from the sludge and other sewage or impure liquids passed through filtering mediums now in use and which of themselves are not sufficiently large to be bodily removed from the filter for the purposes above stated, retain some of the bacteria or disease germs within the filtering medium and thus decrease its efficacy as a filter. To avoid this difficulty and after the filtered liquid has been passed away and a large portion of the solid matter has been taken out and disposed of as above stated, the filter or filtering medium has been heretofore cleansed by "flushing" it with water or otherwise. This method of cleansing filters, while good, is not perfect and does not separate all the disease germs from the filtering medium. Again, the disease germs that are flushed away from the filtering medium have not been killed but have only been transferred to the flush-water and by the flush water are carried to some other point where they again cause disease, and the flush water, being thus contaminated, is a cause of trouble and requires purification.

Bacteria are organic in their nature and are the naturally provided scavengers which transform vegetable or organic matter into mineral inorganic matter. While bacteria are thus designed and do have a useful function in the evolution of nature, yet its very existence or at least the existence of some forms of bacteria is injurious to health, and produces, as is now well understood, epidemics. The various classifications or species of bacteria are not fully developed; yet we know from scientific research that some forms are injurious while others are not so or neutral.

In using liquid pregnant with bacteria it is impossible to make a separation, of the noxious from the neutral bacteria and in thickly settled communities such as in large cities, the plan of utilizing the recovered solids and impure organic matter for purposes of fertilization, as above stated, is impracticable because principally of the absence of land in sufficient area located sufficiently remote from the habitations of the city residents. The only safe plan, therefore, of treating sewage of cities in order to prevent the spread of disease, is to employ means to kill the injurious action of the bacteria therein.

It is, therefore, the prime object of this invention to so treat the liquid sewage and other impure liquids as to absolutely dispose of and consume the said impurities and solid matters recovered therefrom, thus completely and absolutely destroying all the bacteria and disease germs therein. This is accomplished by the application of heat to the said impurities and the solid matters after the same have been separated out from the liquid portion by any suitable system of filtration. By thus volatilizing or consuming the impure and solid matters I not only destroy absolutely the microbes, bacteria and disease germs, and thus prevent the possibility of contagion and epidemics of disease occurring therefrom, but I save also the expense of providing other means of or apparatus for disposing of said impurities and solid matters after filtration, and also avoid the necessity of constantly "flushing" the filter bed with clean water which would thereby become polluted and have to be, in its turn, purified or else disposed of in some other and probably injurious manner.

After repeated experiments in various methods of treating sewage and impure liquids, I have discovered that the bacteria and disease germs therein can be absolutely disposed of and destroyed only by the application of heat.

My invention therefore consists in the method of treating liquid sewage and other impure liquids by separating the impurities, solid portions and impure organic matter thereof from the liquid portions with the aid of any suitable filtering medium, and by then volatilizing and consuming the said impurities, solid portions and impure organic matter by the application of heat thereto, having first conveyed the cleansed liquid portion away to any desired point; the same being more fully stated in the accompanying description and the claims hereto appended.

The drawing forming part of this specification illustrates simply one of the many forms of apparatus adapted to carry out my method and is intended only for that purpose, no attempt being here made at details of mechanical construction; and I would here state that among other forms of apparatus that could be thus employed, is that shown in my application, Serial No. 415,845, filed December 22, 1891, of which this present application is a division. Said drawing shows a tank A with an inlet $a$ and an outlet $b$, a filter bed or filtering medium B and a fuel nozzle C.

The operation of the invention by the use of this simple apparatus is as follows: The sewage or other impure liquid is passed into the tank A at $a$ and after passing through the filtering medium B, the purified or filtered liquid portion is passed off through the exit $b$, the solids and other impure matters being retained upon and by the filtering medium. Heat is then applied to the retained impurities by means of gas or other fuel supplied through the supply pipe $c$ until all of said solid matter and other impurities are thus volatilized and consumed, when more sewage may be injected into the tank at $a$ and the operation repeated. Air is supplied with or without a "blast" through the pipe $c'$ and where gas is the heating medium I prefer to use an air blast of any suitable or common form.

The tank A may be of any suitable size, shape or construction desired and the filtering medium may likewise be of any suitable or convenient construction or material. One or a plurality of fuel supply nozzles may be used, depending upon the size of the tank and the character of the fuel used, and when so used the construction may or may not be similar to that disclosed in my aforesaid application. I say gas or some other fuel may be used to volatilize or consume the solid and other impurities recovered from the filter bed, because I may use electricity or other well known means of producing combustion and volatilization. I may also use a blower of any well known form to cause the gas or other heating fluid to impinge with considerable force upon the filtering medium if desired.

Whether or not a closed tank, such as is shown in my said application, is used, I may or may not prefer to agitate all or only the surface of the filter bed during or before the process of volatilization, and I may or may not use the means shown for this purpose in my said application. In such case a simple agitator arm D adapted by any well known mechanism for vertical adjustment may be used, as shown in the illustration.

In some cases the filter bed may be of such material as to become more or less dry after the liquid has been passed through it and it may consist of a volatile substance, so that upon the application of heat the entire filter bed will become volatilized and consumed at the same time that the solid matter and the impurities held in suspension in said filtering medium are consumed. Of course it will be understood that in such cases it will be necessary to refill the tank or to duplicate the filtering medium before the process is again carried into effect. I do not therefore desire to illustrate or claim herein any specific apparatus for carrying my invention into practice, as any suitable filtering medium that will properly arrest the impurities and solid matter from the liquid that is passed to said filtering medium may be used, and any desirable heat that can be applied to said solid matter and impurities or to said filtering medium or to both for the purpose of completely consuming and volatilizing the same may also be used. Furthermore, I have described with sufficient certainty as to details in my aforesaid application one apparatus applicable to the carrying out of the method herein described, to which application reference may be had although there are other means of practicing my method.

I am aware that heretofore garbage and other refuse matter has been put into a furnace and so suspended therein on a shelf or sieve prior to being consumed by fire, that some of the liquid with which the garbage was incorporated has been separated out by gravity and drained out of the bottom of said furnace; and that this is the nearest approach heretofore to the novel and improved method of treating sewage and other impure liquids herein proposed.

What I claim, and desire to secure by Letters Patent, is—

1. The method of disposing of the solids and impurities of sewage and other impure liquids, which consists in subjecting the same to a suitable filtering medium within a suitable receptacle and then volatilizing or causing the combustion of the solids and impurities arrested by said filtering medium without removal from said receptacle, substantially as described.

2. The method of disposing of the solids and impurities of sewage and other impure liquids, which consists in separating within a suitable receptacle the solid portions and other impurities from the liquid portions by filtration, and then subjecting said impurities and solids, without being removed from said receptacle, to the action of heat to volatilize and comsume the same, substantially as described.

3. The method of disposing of the solids and impurities of sewage or other impure liquids which consists in first separating the liquid from the solid portions by passing the sewage or other liquid to be treated through a filter bed located within a suitable receptacle, then conducting the fluid thus cleansed away from said receptacle, and then subjecting the solids deposited upon the filter bed and arrested in the filtering medium to blasts of flame without being removed from said receptacle, whereby said solids and impurities are completely volatilized and consumed, substantially as described.

4. The method of sewage disposal which consists in separating in a suitable receptacle, the liquids from the solids thereof by filtration, in conducting the filtered liquid away from the receptacle, and finally in agitating or stirring the solids deposited upon the filter bed and simultaneously subjecting said solids to blasts of flame without being removed from said receptacle, substantially as described.

5. The method of sewage disposal which consists in subjecting the sewage to a combustible filtering medium located within a suitable receptacle to separate the solid from the liquid portion of the sewage, and then simultaneously volatilizing or causing the combustion of the solids and the said filtering medium within the said receptacle and after the cleansed liquid has been passed off, substantially as and for the purpose set forth.

In testimony that I claim the foregoing as my invention I affix my signature in presence of two witnesses.

IRA H. JEWELL.

Witnesses:
TAYLOR E. BROWN,
GEORGE W. HIGGINS, Jr.